United States Patent
Deschepper et al.

(10) Patent No.: US 6,199,134 B1
(45) Date of Patent: *Mar. 6, 2001

(54) COMPUTER SYSTEM WITH BRIDGE LOGIC THAT ASSERTS A SYSTEM MANAGEMENT INTERRUPT SIGNAL WHEN AN ADDRESS IS MADE TO A TRAPPED ADDRESS AND WHICH ALSO COMPLETES THE CYCLE TO THE TARGET ADDRESS

(75) Inventors: Todd Deschepper, Spring, TX (US); Russ Wunderlich, Turnwater, WA (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,529

(22) Filed: Mar. 13, 1998

(51) Int. Cl.[7] ............................. G06F 1/32; G06F 13/00
(52) U.S. Cl. ......................................... 710/129; 713/324
(58) Field of Search ............................. 710/15–19, 126, 710/128, 129, 130, 260–269; 713/320, 324

(56) References Cited

U.S. PATENT DOCUMENTS

| | | | | |
|---|---|---|---|---|
| 5,499,346 | * | 3/1996 | Amini et al. | 395/908 |
| 5,619,729 | * | 4/1997 | Bland et al. | 395/848 |
| 5,634,073 | | 5/1997 | Collins et al. | 395/825 |
| 5,752,043 | * | 5/1998 | Suzuki | 395/737 |
| 5,802,269 | * | 9/1998 | Poisner et al. | 395/183.2 |
| 5,875,307 | * | 2/1999 | Ma et al. | 395/281 |
| 5,881,253 | * | 3/1999 | Seeman | 395/308 |
| 5,887,131 | * | 3/1999 | Angelo | 395/188.01 |
| 5,890,004 | * | 3/1999 | Poisner | 395/750.01 |

OTHER PUBLICATIONS

VLSI Digital Signal Processors by Vijay K. Madisetti (Georgia Institute of Technology) Chapter 3, pp. 61–63; Butterworth–Heinemann.

* cited by examiner

Primary Examiner—David A. Wiley
(74) Attorney, Agent, or Firm—Conley, Rose & Tayon, P.C.; Michael F. Heim; Jonathan M. Harris

(57) ABSTRACT

A computer system includes a South bridge logic that connects an expansion bus to one or more secondary expansion busses and peripheral devices. The South bridge logic includes internal control devices that are targets for masters on the expansion bus. The target devices couple to the expansion bus through a common expansion target interface, which monitors and translates master cycles on the expansion bus on behalf of the target devices. The South bridge includes an ACPI/power management logic capable of supporting a Device Idle mode in which selected I/O device may be placed in a low power state. To prevent cycles from being run to a device in a low power state, the ACPI/power management includes status registers that are used to determine when a device in low power mode is the target of an expansion bus cycle. If such a cycle occurs, the cycle is intercepted and an SMI signal is transmitted to the CPU. In addition, the target interface responds to the master by asserting a retry signal. When the transaction is retried, the cycle is passed to the target, which responds with an invalid data signal. The CPU by this time, or at some subsequent time realizes that the target was asleep based upon processing of the SMI signal. The CPU then either re-executes the cycle when the device is removed form the low power state, or else simply rejects the invalid data.

32 Claims, 7 Drawing Sheets

FIG.6A — FLOPPY I/O TRAP MASK REGISTER

| 7 | 6 | 5 | 4 | 3 | 2 | 1 | 0 |
|---|---|---|---|---|---|---|---|
| I/O TRAP ENABLE | TIMER ENABLE | | | | | | |

FIG.6B — HARD DRIVE TRAP MASK REGISTER

| 7 | 6 | 5 | 4 | 3 | 2 | 1 | 0 |
|---|---|---|---|---|---|---|---|
| I/O TRAP ENABLE | TIMER ENABLE | | | | | | |

FIG.7A — DEVICE I/O TRAP STATUS REGISTER

| 7 | 6 | 5 | 4 | 3 | 2 | 1 | 0 |
|---|---|---|---|---|---|---|---|
| #7 TRAP STATUS | #6 TRAP STATUS | #5 TRAP STATUS | #4 TRAP STATUS | #3 TRAP STATUS | #2 TRAP STATUS | HD TRAP STATUS | FDD TRAP STATUS |

COMPUTER SYSTEM WITH BRIDGE LOGIC THAT ASSERTS A SYSTEM MANAGEMENT INTERRUPT SIGNAL WHEN AN ADDRESS IS MADE TO A TRAPPED ADDRESS AND WHICH ALSO COMPLETES THE CYCLE TO THE TARGET ADDRESS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to computer systems. More particularly, the present invention relates to circuitry that forms a communications "bridge" between components in a personal computer system. Still more particularly, the present invention relates to a bridge logic that implements a procedure for completing transactions to target devices that are in a sleep mode, while notifying the master device that the target is asleep.

2. Background of the Invention

A personal computer system includes a number of components with specialized functions that cooperatively interact to produce the many effects available in modern computer systems. The ability of these various components to exchange data and other signals is vital to the successful operation of a computer system. One of the critical requirements in designing a new computer system is that all system components (including those that may be added to the system by a user) must be compatible. A component is compatible if it effectively communicates and transfers data without interfering or contending with the operation of other system components. Because modern computer systems are designed with components that operate with different protocols, the likelihood that components may not properly communicate is heightened. Compatibility between devices with different protocols is achieved, at least in part, with bridge logic devices. As the name implies, bridge logic devices provide a communications "bridge" between components and busses that operate according to different protocols. The present invention is directed to an improved bridge logic device.

Computer systems include components with different protocols because of the manner in which computers have evolved, and the desire to design new computers to be backwardly-compatible with prior designs. Early computer systems had relatively few components. As an example, some of the early computer systems included a processor (or CPU), random access memory (RAM), and certain peripheral devices such as a floppy drive, a keyboard and a display. These components typically were coupled together using a network of address, data and control lines, commonly referred to as a "bus." As computer technology evolved, it became common to connect additional peripheral devices to the computer through ports (such as a parallel port or a serial port), or by including the peripheral device on the main system circuit board (or "motherboard") and connecting it to the system bus.

The computer operates by having data flow through the system, with modification of the data occurring frequently. Typically, the CPU controls most of the activities of the computer system. The CPU supervises data flow and is responsible for most of the high-level data modification in the computer. The CPU, therefore, is the "heart" of the system and receives signals from the peripheral devices, reads and writes data to memory, processes data, and generates signals controlling the peripheral devices.

Since the introduction of the first computer systems, computer technology has continued to evolve at a relatively rapid pace. New peripheral devices have been developed, and both processor speeds and the size of memory arrays have increased dramatically. In addition to the introduction of more powerful and faster processors, and the emergence of new and improved peripheral devices, there has been an increasing desire for a mobile computer that can be easily used in more than one location. Such computers have come to be known as laptop computers, because the user can literally operate these mobile computers on his or her lap if desired. In contrast to traditional desktop computers that might weigh in excess of 25 pounds, laptop computers typically weigh less than 10 pounds, including the monitor and all peripherals.

FIG. 1 shows a representative prior art laptop computer system that includes a CPU coupled to a bridge logic device via a CPU bus. The bridge logic device is sometimes referred to as a "North bridge" for no other reason than it often is depicted at the upper end of a computer system drawing. The North bridge also couples to the main memory array by a memory bus. The North bridge couples the CPU and memory to the peripheral devices in the system through a Peripheral Component Interconntect ("PCT") bus or other expansion bus. Various components that understand PCI protocol may reside on the PCI bus, such as a graphics controller.

As noted above, it is desirable to design computer systems so that they are backwardly compatible with prior peripheral designs. This backwards compatibility can be achieved by adding additional or secondary expansion busses that couple to the primary expansion bus. If other secondary expansion busses are provided in the computer system, another bridge logic device typically is used to couple the primary expansion bus to the secondary expansion bus. This bridge logic is sometimes referred to as a "South bridge" reflecting its location vis-a-vis the North bridge in a typical computer system drawing. An example of such bridge logic is described in U.S. Pat. No. 5,634,073, assigned to Compaq Computer Corporation.

In FIG. 1, the South bridge couples the PCI bus to an ISA bus. Various ISA-compatible devices are shown coupled to the ISA bus. As one skilled in the art will understand, devices residing on the ISA bus may be targets for devices coupled to the PCI bus, including the CPU. Thus, even though the CPU is not directly connected to the ISA bus, it may still read and write data, or perform other operations, to devices on that bus. The PCI protocol permits devices residing on the PCI to run master cycles to targets residing on the PCI bus.

Laptop computers have two critical design criteria that affect every component in the laptop computer. Those design criteria are size and power consumption. Laptops are designed to be as light and as thin as possible to make it easier for the user to carry. Thus, components are selected based, at least in part, on their size and weight. The second criteria, power consumption, reflects the fact that laptop computers are intended to operate at times solely upon battery power. Thus, the components used in a laptop are also selected based upon power consumption.

In an effort to extend the length of time that a laptop computer can operate under battery power, techniques have been developed that reduce power consumption when the system is not being used. Thus, for example, if a user has a laptop computer turned on, but is not actively inputting data into the system, the computer may automatically enter a low power mode to reduce power consumption. More recently, even more sophisticated techniques have been considered which permit particular components or peripheral devices to be placed in a low power (or sleep) mode. Thus, a laptop computer may cause a component, such as a hard drive, to go into a sleep mode independently of other system components if that drive has been inactive for a predetermined length of time. This flexibility can significantly reduce power consumption as selective system components are placed in a sleep mode even during periods when the user is using the system.

While this ability to independently place components in a sleep mode has obvious advantages, it also unfortunately has drawbacks. One serious drawback is that the components that are active may need to access components that are asleep. In that situation, there is a risk that a master device will complete a cycle to a sleeping target without realizing that the target was unable to properly process the transaction. Thus, data obtained during a read cycle to a sleeping target is likely invalid, and data that was to be written to a sleeping target may not have been accurately processed. Another risk is that the system may hang because the target does not provide the necessary signals back to permit the master to complete the cycle.

Because of these and other potential problems with powering down selected components, some computer designers have resisted implementing the selective power-down technique. Even as those designs that do use selective power-down of independent components, no technique has been developed that affirmatively notifies the master device that the target is asleep, and which is still capable of allowing the cycle to complete to the sleeping target. Despite the apparent advantages such a system would offer, to date no such solution has been found.

SUMMARY OF THE INVENTION

The present invention includes a bridge logic device that overcomes the problems described above by providing a common expansion bus target interface that functions as an interface for all controllers residing in the bridge logic. The target interface receives signals from masters on the expansion bus and translates those signals to a standard protocol understood by all targets in the bridge logic device. The internal controllers and targets in the bridge logic couple to the target interface through a set of standardized address, data and control lines referred to herein as the IMAX (Internal Modular ASIC EXpansion) target bus.

According to the preferred embodiment of the present invention, two of the internal controllers in the bridge logic device are a ACPI/power management logic and an interrupt controller. In the preferred embodiment, the ACPI/power management logic includes registers for programming the ability of various components to be powered down. Additional registers also provide status information as to which system components have been powered down (or put into a sleep mode). In the event that the target interface receives a transaction targeting a component that is in sleep mode, the target interface requests that the device initiating the transaction retry the transaction at a subsequent time. At substantially the same time, the ACPI/power management logic transmits an internal SMI signal to the interrupt controller, causing the interrupt controller to issue an System Management Interrupt ("SMI") request to the CPU on an appropriate interrupt line. The CPU receives the SMI and enters a system management mode to determine the reason for the interrupt. Lastly, the status register in the ACPI/power management logic is reset. When the transaction is subsequently retried on the expansion bus, the cycle is completed to the target since the status register has been reset. The target returns data that is likely invalid since the SMI may not have yet caused the sleeping device to be turned on by the processor. Because, however, the processor receives the SMI before receiving data, the processor will realize that the data was returned from a device that was in a sleep mode.

In the preferred embodiment, a South bridge logic device is disclosed that includes a common PCI target interface. The PCI target interface couples to each of the interface controllers within the South bridge logic, such as the ISA controller, and the IDE controller, among others. The PCI target interface preferably couples to these internal interface controllers via an internal modular target expansion bus. As various components on the different busses are powered-down, appropriate status information is set in "trap" registers preferably located in the ACPI/power management logic. The setting of the appropriate bit in the trap registers causes trapped addresses to be compared to any transaction addresses directed to the South bridge. The initial transaction is intercepted, and thus not received by the sleeping device, to permit an SMI signal to be transmitted on an interrupt line to the CPU. At the same time, the master device is asked to retry the transaction at a later time.

According to another aspect of the present invention, a South bridge logic device includes an internal modular expansion bus comprised of separate master and target busses. The target internal modular expansion bus preferably connects to a target interface for coupling the internal expansion bus to an external expansion bus. The target interface functions as a common interface to the external expansion bus for all interface controllers in the South bridge that can receive master cycles from the external expansion bus. In the preferred embodiment, the external expansion bus is the PCI bus, but the target interface could be readily adapted to operate with other expansion busses, and may even be modified to operate with a plurality of expansion busses. As a result of this configuration, all cycle requests from the PCI bus (or other expansion bus) are routed through the target interface in the South bridge. Registers preferably are provided in an ACPI/power management logic that causes timers to be set to monitor activity of various components within the computer system. If a timer expires without any activity, then the associated component may be placed in a low power mode to preserve battery life. A status register (or trap register) also is provided to indicate when a component is placed in a low power mode. If a subsequent access is made on the PCI bus to the target that has been placed in the low power mode, the trap register is checked to determine if that device is in a low power mode. If so, logic in the ACPI/power management logic causes an SMI signal to be transmitted to the processor to alert the processor of this problem. At the same time, the PCI master receives a retry signal, and the trap register bit is reset. When the transaction is retried, the transaction is permitted to go to the sleeping device, which returns (perhaps invalid) data. The processor, however, has by then begun to process the SMI and will realize that the data received was from a device in sleep mode.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiment is considered in conjunction with the following drawings, in which:

FIGS. 6A and 6B illustrate trap mask registers for implementing the methodology of FIG. 5; and FIGS. 7A, 7B and 7C are status registers for implementing the methodology of FIG. 5.

The following detailed description describes the preferred embodiment for implementing the underlying principles of the present invention. One skilled in the art should understand, however, that the following description is meant to be illustrative of the present invention, and should not be construed as limiting the principles discussed herein. In addition, certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF A PREFERRED EMBODIMENT

Figure 1:
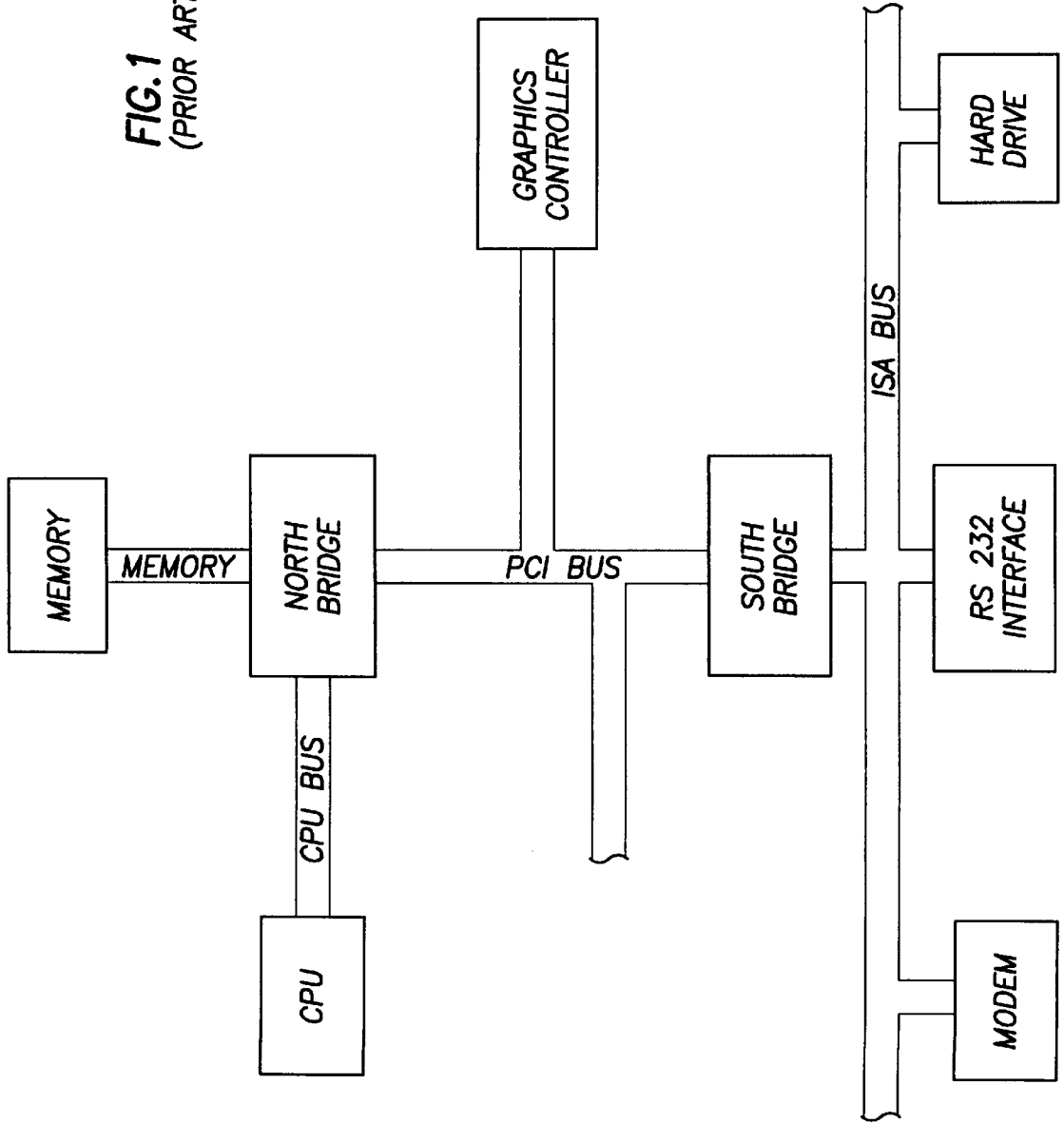
FIG. 1 is a block diagram of a prior art computer system implementing a bridge logic to couple together dissimilar busses.
Figure 2:
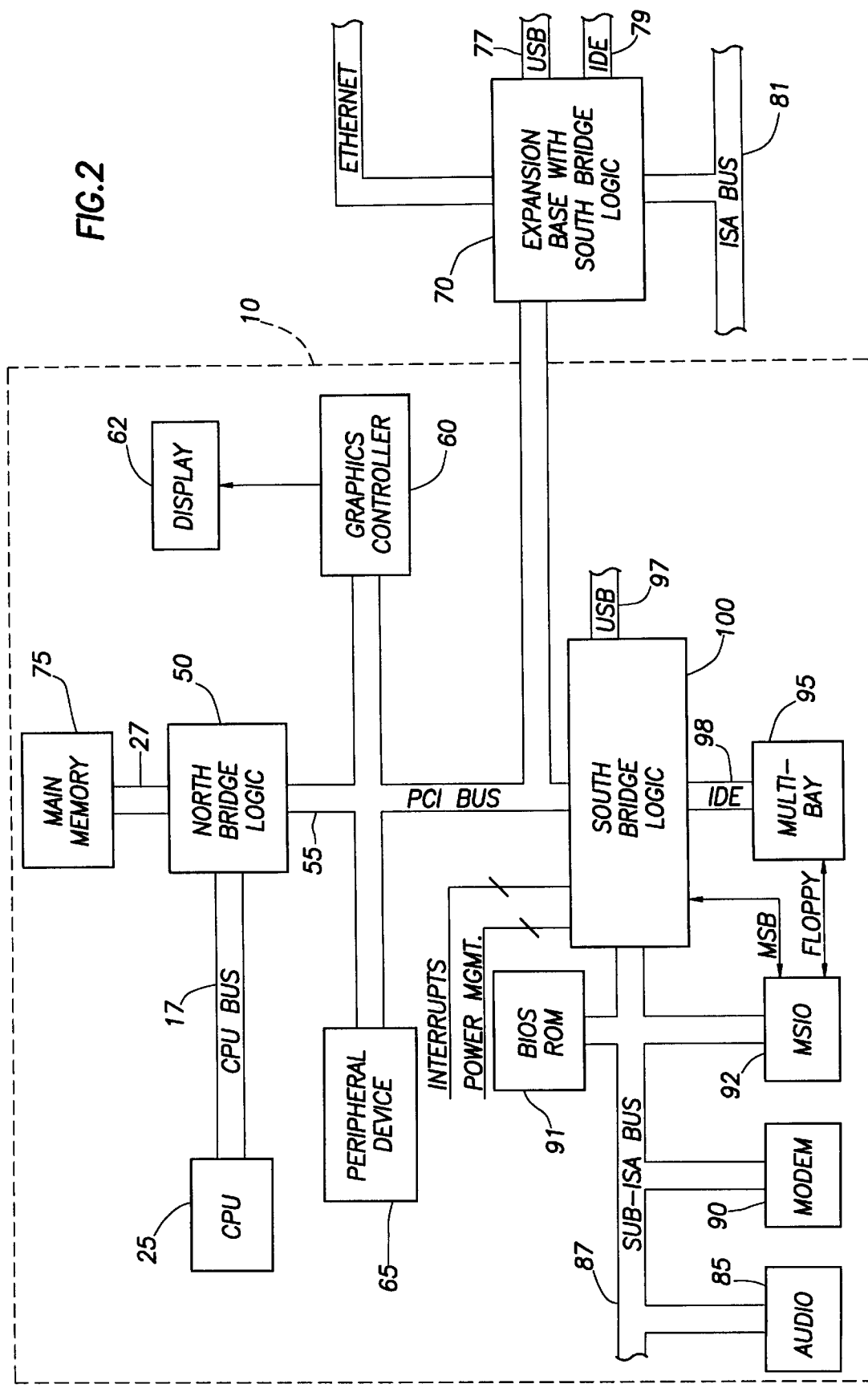
FIG. 2 is a block diagram of a portable computer system constructed in accordance with the preferred embodiment of the present invention with an improved bridge logic device.

Referring now to FIG. 2, a computer system 10 constructed in accordance with the preferred embodiment generally includes a processor or CPU 25 coupled to a main memory array 75 and a variety of other peripheral computer system components through an integrated bridge logic device 50. As depicted in FIG. 2, the bridge logic 50 sometimes is referred to as a "North bridge." The CPU preferably couples to bridge logic 50 via a CPU bus 17, or the bridge logic 50 may be integrated into the CPU 25. The CPU 25 may comprise, for example, a Pentium® II Microprocessor. It should be understood, however, that other alternative types of microprocessors could be employed. Further, an embodiment of computer system 10 may include multiple processors, with each processor coupled through the CPU bus 17 to the bridge logic unit 50.

The main memory array 75 preferably couples to the bridge logic unit 50 through a memory bus 27, and the bridge logic 50 preferably includes a memory control unit (not shown) that controls transactions to the main memory 75 by asserting the necessary control signals during memory accesses. The main memory 75 functions as the working memory for the CPU 25 and generally includes a conventional memory device or array of memory devices in which application programs and data are stored. The main memory array may comprise any suitable type of memory such as dynamic random access memory ("DRAM") or any of the various types of DRAM devices such as synchronous dynamic random access memory ("SDRAM") or extended data out dynamic random access memory (EDO DRAM).

The computer system 10 also preferably includes a graphics controller 60 that couples to the bridge logic 50 via an expansion bus 55 as shown in FIG. 2. Alternatively, the graphics controller 60 may couple to bridge logic 50 through an Advanced Graphics Port ("AGP") bus (not specifically shown). As one skilled in the art will understand, the graphics controller 60 controls the rendering of text and images on a display device 62. The graphics controller 60 may embody a typical graphics accelerator generally known in the art to render three-dimensional data structures on display 62. These data structures can be effectively shifted into and out of main memory 75 via the expansion bus and bridge logic 50. The graphics controller 60 therefore may be a master of the expansion bus (including either PCI or AGP bus) enabling the graphics controller 60 to request and receive access to a target interface within the bridge logic unit 50, including the memory control unit. This mastership capability permits the graphics controller 60 to access main memory 75 without the assistance of the CPU 25. A dedicated graphics bus accommodates rapid retrieval of data from main memory 75. As will be apparent to one skilled in the art, the bridge logic 50 includes a PCI interface to permit master cycles to be initiated and received by bridge logic 50. If an AGP bus is included in the system, the bridge logic 50 also includes an interface for initiating and receiving cycles to and from components on the AGP bus. The display 62 comprises any suitable electronic display device upon which an image or text can be represented. A suitable display device may include, for example, a cathode ray tube ("CRT"), a liquid display ("LCD"), a thin film transistor ("TFT"), a virtual retinal display ("VRD"), or any other type of suitable display device for a computer system.

In the preferred embodiment, the expansion bus 55 comprises a Peripheral Component Interconnect (PCI) bus. The present invention, however, is not limited to any particular type of expansion bus, and thus various busses may be used including a high speed (100 MHz or faster) PCI bus. In the preferred embodiment, a plurality of PCI peripheral devices may reside on the PCI bus 55. The PCI devices may include any of a variety of peripheral devices such as, for example, network interface cards (NIC's), video accelerators, audio cards, hard or floppy disk drives, PCMCIA drives, Small Computer Systems Interface ("SCSI") adapters and telephony cards. Although only one PCI peripheral device 65 is depicted in FIG. 2, it should be recognized that computer system 10 may include any number of PCI devices as desired.

The following discussion describes the preferred embodiment of computer system 10 for a laptop computer that can be connected to an expansion base 70 via the PCI bus 55.

This should not be construed as limiting the present invention to a laptop. The present invention also may be used with a desktop system, work station, server, or handheld computer. In addition and as mentioned above, computer system 10 can be implemented with respect to the particular bus architectures shown in FIG. 2 (i.e., PCI bus), or other bus architectures, as desired. The embodiment described herein, however, assumes bus 55 represents a PCI bus, as shown in FIG. 2, and thus the following discussion will focus on configuring the present invention for that embodiment. Further, CPU 25 preferably comprises a Pentium® II processor and thus CPU bus 17 represents a Pentium II bus®. These bus protocols and the terminology used with respect to these protocols are well known to those of ordinary skill in the art. If a more thorough understanding of the PCI, or Pentium® II bus is desired, reference should be made to the *PCI Local Bus Specification* (1993), and *Intel P6 External Bus Specification*. If an AGP bus also is used in the computer system, reference may be made to the *Accelerated Graphics Port Interface Specification* (Intel, 1996).

Referring still to FIG. 2, another bridge logic device 100 also preferably connects to expansion bus 55. This bridge logic device 100 (which sometimes is referred to a "South bridge") couples or "bridges" the primary expansion bus 55 to other secondary expansion busses. These other secondary expansion busses may include an ISA (Industry Standard Architecture) bus, a sub-ISA bus, a USB (Universal Serial Bus), an IDE bus, an IEEE 1394 standard (or "fire wire") bus, or any of a variety of other busses that are available or may become available in the future. In the preferred embodiment of FIG. 2, the South bridge logic 100 couples to a sub-ISA bus 87, a USB bus 97 and an IDE bus 98. As will be apparent to one skilled in this art, various peripheral devices may be coupled to each of these busses. Thus, as shown in the preferred embodiment of FIG. 2, an MSIO (Mobile Super I/O) chip 92 connects to the sub-ISA bus, as does an audio card 85, modem 90 and BIOS ROM 91. Similarly, according to the preferred embodiment, a multi-bay configuration couples to the IDE bus 98 and to the MSIO 92. The multi-bay configuration preferably includes three independent bays connected in any master/slave, primary/secondary configuration supporting hot-plugging of IDE devices in the bays. As one skilled in the art will understand various IDE devices are available including hard drives, CD ROM drives, floppy drives, tape drives, and the like. The USB 97 supports various peripherals, especially video peripherals such as video cameras for teleconferencing purposes. In addition to the busses discussed above, the South bridge also preferably connects to interrupt signal lines, power management signal lines, and a MSB (MSIO Serial Bus).

As noted above, the computer system 10 preferably comprises a laptop computer. To facilitate use of the computer system 10 within a traditional desktop environment, an expansion base preferably is available for connecting the laptop computer system to additional peripheral devices and to a computer network via an Ethernet bus. The expansion base may include any type of configuration, including a port replicator or docking station. The present invention envisions, however, that the expansion base also includes a South bridge logic (not shown specifically) for coupling components on the PCI bus to other components coupled to the expansion base. Thus, as shown in FIG. 2, a South bridge logic device within the expansion base 70 couples the PCI bus to various expansion busses including an ISA bus 81, USB 77 and IDE bus 79. The following discussion focuses on the architecture of the South bridge logic 100. This same architecture may be used (with some minor modifications), if desired, for the South bridge logic within the expansion base 70. Alternatively, the present invention also may be implemented by using a prior art South bridge device in the expansion base 70.

Figure 3:
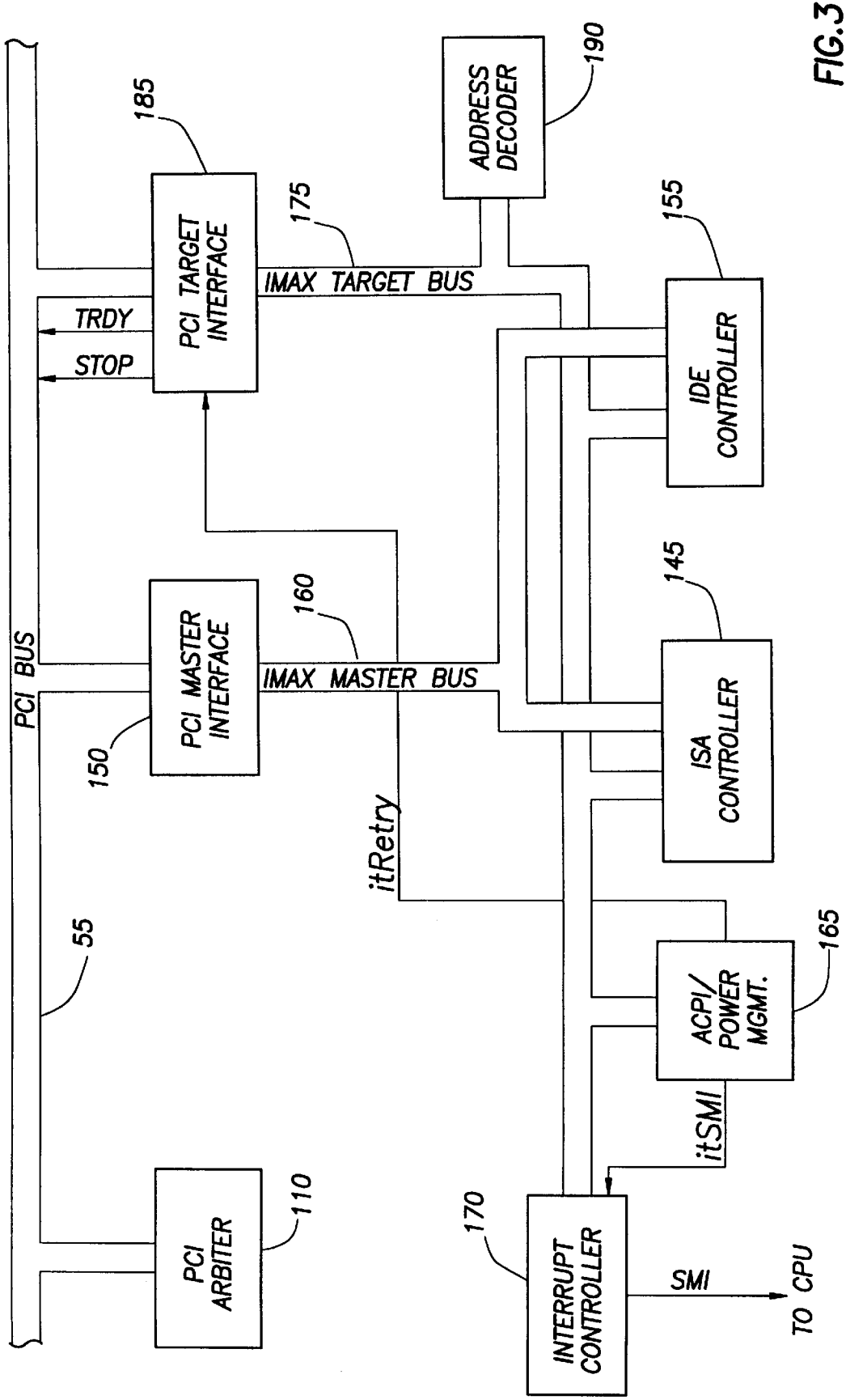
FIG. 3 is a block diagram of the improved bridge logic device of FIG. 2 that illustrates a common bus target interface.
Figure 4:
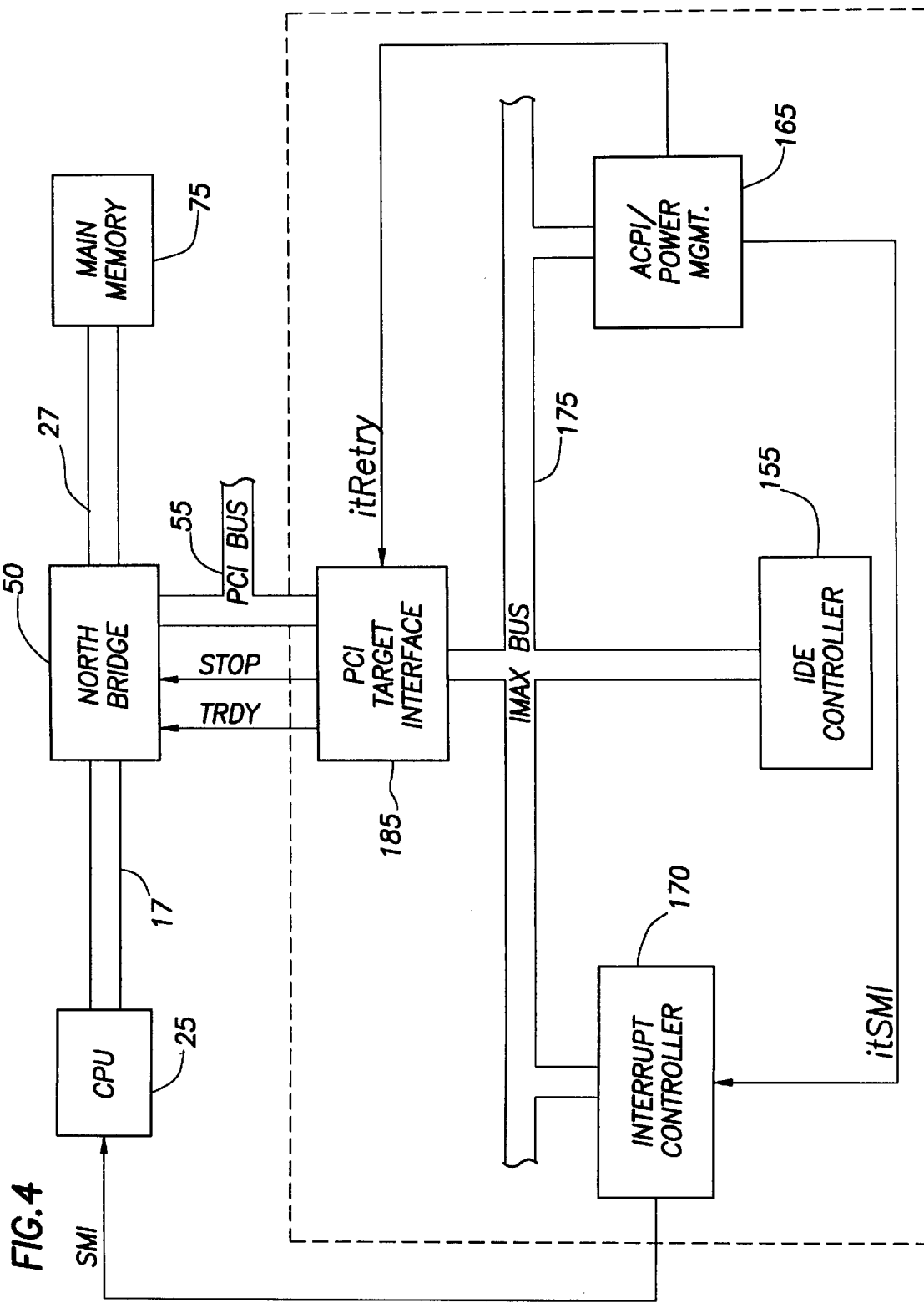
FIG. 4 is a schematic block diagram of the bridge logic device of FIG. 2 constructed in accordance with the preferred embodiment of the present invention.

Referring now to FIGS. 3 and 4, the South bridge 100 constructed in accordance with the preferred embodiment generally includes a PCI target interface 185 that couples South bridge devices that are the targets of cycles on the PCI bus 55, a PCI master interface 150, a PCI arbiter unit 110, a plurality of internal target devices, and an IMAX (Internal Modular ASIC EXpansion) target bus 175 and IMAX master bus 160. Although FIG. 3 shows the South bridge 100 connecting to a PCI bus, it should be understood that expansion bus 55 may comprise any type of system bus capable of use in a computer system. Thus, for example, expansion bus 55 may comprise an IEEE standard 1394 (fire wire) bus, or any other suitable bus. Similarly, while bus target interface device 185 and master interface 150 are shown as a PCI target interface, both of these interfaces may be modified for use with other bus standards. The only requirement is that target interface must be capable of detecting and claiming master cycles on the expansion bus, and the master interface must be capable of executing master cycles on the expansion bus.

The internal target devices comprise logic circuitry within the South bridge, or control interfaces within the South bridge associated with components and/or busses external to the South bridge 100. Four internal targets are shown in FIG. 3, including an ISA controller 145, an IDE controller 155, an ACPI/power management logic 165, and an interrupt controller 170. Each of these targets are referred to as "internal targets" denoting the fact that each of these devices are capable of receiving PCI signals via the target interface 185 and the IMAX target bus 175, and of providing outbound data, when requested, on the IMAX target bus 175. In the preferred embodiment, the IMAX target bus 175 includes an inbound data bus and a separate outbound data bus. The IMAX target bus 175 preferably includes data, address and control lines for transmitting the necessary information to the internal target to enable that device to complete the requested transaction.

Thus, the expansion target interface 185 couples internal target devices within the South Bridge 100 to external masters on the expansion bus 55. The implementation of a common expansion bus target 185 and internal modular target bus makes it unnecessary for the internal target devices 145, 155, 165, 170 to understand PCI protocol (or whatever the protocol is of the expansion bus) signals. The internal targets 145, 155, 165, 170 need only be capable of implementing a single protocol, the IMAX protocol. In contrast to prior systems in which each of the internal control devices in the bridge logic were required to understand the protocol of the expansion bus (in FIG. 3, the PCI protocol), the expansion bus target interface 185 of the present invention performs the necessary translations from the PCI protocol to the IMAX protocol. As a result, the internal IMAX target devices need not be capable of understanding and running PCI cycles since the expansion bus target interface 185 performs that function. In addition, because the interface to the internal targets is always the same, one internal target design can be used to communicate with various different expansion busses. The only requirement is that the target interface be capable of translating the various protocols to the IMAX protocol. In addition, with respect to the outbound data, the IMAX target bus is non-tristateable, and is always driven. Consequently, it appears to the internal target that it is the only target talking to the expansion target interface.

Referring still to FIGS. 3 and 4, the ISA controller 145, IDE controller 155 and interrupt controller 170 function as an interface to an external component or bus. Furthermore, the ISA controller 145 and IDE controller 155 preferably function as IMAX masters, and thus also couple to the IMAX master bus 160, as best shown in FIG. 3. For master read cycles to the expansion bus, the inbound IMAX target bus preferably is used as the bus providing the read data from the PCI bus to the internal IMAX master.

The PCI target interface 185 monitors PCI bus cycles and determines when a valid cycle has been run on the PCI bus. In the preferred embodiment, the PCI target interface 185 couples to an internal address decoder 190 and configuration registers (not shown specifically). The configuration registers are used to determine if a target is within the South bridge or whether the address is located on a secondary expansion bus. The PCI target interface 185 preferably provides an output signal (VALID) to the address decoder 190 indicating the detection of a valid PCI cycle. When the address decoder determines that a PCI address corresponds to an address internal to the South bridge, or to an address on the IDE bus or ISA bus, the address decoder 190 provides a MATCH signal to the PCI target interface 185. The PCI target interface 185 also couples to the IMAX target bus 175 to transmit inbound address, data, control and command signals to IMAX targets. In accordance with the preferred embodiment, the target interface provides control signals in conformance with the PCI protocol, including for example a target ready (trdy) signal indicating that the target interface is ready to receive write data, or ready to transmit read data, as part of a PCI cycle targeting a South bridge device. Another control signal that the target interface 185 generates for transmission on the PCI bus is a stop (stop#) signal. In accordance with the PCI convention, the stop# signal is asserted to request that the PCI master device terminate the transaction. In accordance with the PCI protocol, assertion of the stop# signal when trdy# is deasserted may be used to signal a "retry" to the master. The target interface 185 may signal a retry to indicate that the current transaction cannot be completed in timely fashion, but that it may be able to process the transaction at a later time. In this disclosure, the term "retry signal" may be used to refer to the transmission of the stop# signal while trdy# is deasserted. In addition to the two control signals specifically identified in FIGS. 3 and 4, various other control signals are exchanged between the PCI bus 55 and the target interface, in accordance with the PCI protocol. In addition, the target interface couples to the PCI bus 55 through a multiplexed address and data line, as will be apparent to one skilled in the art. If a different expansion bus is used, or if the PCI bus protocol is subsequently modified, appropriate modifications may be made to the target interface 185 without departing from the scope and principles of the present invention. In addition, the above use of the "#" indicates that the signal is asserted by a logic low voltage signal, in accordance with PCI protocol. One skilled in the art will understand that signals also could be asserted high (with a logic high voltage signal) if so desired, and if permitted by the protocol of expansion bus 55.

Each of the internal targets within the South bridge 100 is responsible for posting write data at the rate for which it is designed, and for supplying read data within PCI latency requirements. As will be understood by one skilled in the art, a PCI master starts a PCI cycle by asserting a frame# signal on the appropriate PCI bus line. The PCI bus is a multiplexed address and data bus, and thus the address and data are transmitted on the same 32 bus lines, defined as AD[31:0]. During PCI cycles, the address is transmitted first during an "address phase," followed by the data during the "data phase." The PCI bus includes a clock line, pciclk for synchronizing signals on the PCI bus. The first clock edge on which frame# is asserted defines the address phase, and the PCI address and associated bus control signals are latched on the same rising edge of the pciclk signal. The data phase begins when the target asserts trdy# and the master asserts irdy#, indicating that both target and master are ready for the data transfer.

As one skilled in the art will understand, the PCI bus 55 is capable of transferring data between masters and targets in bursts. A master indicates a desire to perform a burst transaction by holding frame# asserted. In the preferred embodiment, the PCI target interface 185 supports burst cycles for various internal targets when the interface can remain PCI compliant. In the case of transactions to the ISA controller 145, for example, the PCI target interface 185 does not support burst cycles. Thus, if the PCI master holds frame# asserted in an attempt to burst to the ISA bus, the PCI target interface 185 accepts the first data transfer, and then terminates the cycle by asserting the stop (stop#) signal on the PCI bus 55. The PCI target interface 185 does not accept burst cycles to the ISA bus because it takes longer than 8 pciclk clock cycles (the PCI specification requirement) to run most cycles on the ISA bus. Thus, the latency caused by the ISA bus would make the South bridge non-PCI-compliant.

The PCI target interface 185 asserts devsel# positively or subtractively to claim a PCI transaction. When the PCI target interface 185 asserts devsel#, it does not negate devsel# until the transaction ends on the PCI bus 55. The end of the bus transaction is indicated by having frame# negated, irdy# asserted, and either trdy# or stop# asserted. The assertion of trdy# indicates the last data transfer was accepted, whereas the assertion of stop# (with the deassertion of trdy# indicates that the cycle was not completed and should be retried later.

With respect to the internal IMAX targets, the PCI target interface asserts various control signals to orchestrate the transfer of data between the internal targets and the masters on the PCI bus. The various IMAX signals between the PCI target interface 185 and the internal IMAX targets are discussed in a co-pending and commonly assigned application entitled "Computer System With Bridge Logic That Includes An Internal Modular Expansion Bus And A Common Target Interface For Internal Target Devices."

The address decoder 190 couples to the IMAX target bus 175 and to the configuration registers. The address decoder preferably conducts positive decoding of PCI cycles. In addition, in the preferred embodiment the PCI target interface 185 also operates as the subtractive decode agent for the PCI bus. Thus, the PCI target interface 185 claims a PCI cycle by asserting devsel# on the PCI bus 55 when no other PCI device responds to a PCI cycle. These cycles then are passed by the target interface 185 to the ISA bus via the ISA controller 145. Alternatively, the South bridge device in the expansion base 70 may act as the subtractive decode agent for the PCI bus.

Referring still to FIG. 3, the address decoder 190 couples to the PCI target interface 185 to indicate if the PCI signals on the PCI bus comprise valid PCI signals for decoding by address decoder 190. The address decoder 190 indicates to the target interface 185 if the PCI address value matches an address located in the South bridge or on one of the secondary expansion busses coupled to the South bridge, such as the IDE bus of some other bus such as a USB bus. The address decoder 190 also produces a number of chip select output signals (not specifically shown) that are provided to each of the internal IMAX targets and which are used to select one of the internal targets as the target for an IMAX cycle. Stated differently, the chip select signals identify which of the IMAX internal targets are being addressed by the external PCI master. The address decoder 190 is closely linked to the configuration registers. The configuration registers 195 preferably include an Internal I/O Positive Decode Enable Configuration Register that, among other things, indicates if the South bridge 100 is responsible for decoding I/O cycles to an internal South bridge register. In the preferred embodiment, the appropriate bit is set in this register causing the address decoder 190 to decode I/O cycles to internal South bridge devices, while the same register bit is reset in the South bridge in the expansion base 70 (FIG. 2). Thus, in the preferred embodiment, the South bridge 100 exclusively decodes cycles to unique internal I/O register addresses.

The PCI Master interface 150 executes PCI cycles on behalf of ISA bus master 145, IDE master 155, and any other master device within the South bridge 100. As a PCI master, the PCI master interface 150 runs memory and I/O read and write cycles on the PCI bus 55. The PCI master interface 150 also preferably runs memory read line commands when filling ISA/DMA read line buffers. Thus, the PCI master interface 150 asserts standard PCI protocol signals on the PCI bus 55, including multiplexed address and data signals. The PCI master interface 150 translates IMAX master cycles from the IMAX masters to PCI cycles.

In the preferred embodiment, the PCI master interface 150 includes internal IMAX arbiter logic that arbitrates mastership of the IMAX bus 160. Although any arbitration scheme may be used, the preferred embodiment implements a least recently used (LRU) arbitration scheme for awarding mastership of the IMAX master bus 160. Once the internal IMAX arbiter unit arbitrates mastership of the IMAX master bus, the PCI master interface 150 issues control signals selecting a particular master. Although not shown specifically in FIG. 3, each of the IMAX masters indicate a request for mastership of the IMAX master bus 160 by asserting a imReq signal to the PCI master interface 150. The PCI master interface 150 awards mastership by returning an imGnt signal to the IMAX awarded mastership. The IMAX master bus 160 couples each of the internal masters to the PCI master interface 150. Preferably, the IMAX master bus includes address, data and control lines that are common to each of the masters. Additional details regarding the common master interface for South bridge 100 may be obtained from a commonly assigned and co-pending patent application entitled, "Computer System With Bridge Logic That Includes An Internal Modular Expansion Bus And A Common Master Interface For Internal Master Devices."

The PCI arbiter 110 couples to the PCI bus 55 and receives requests from the various PCI masters on the PCI bus (including PCI master interface 150). The PCI arbiter selects one of the requesting masters and assigns the PCI cycle to that master according to known techniques. In the preferred embodiment, the PCI arbiter 110 selects a master from multiple requesting masters based upon a least recently used (LRU) arbitration scheme. Based on this protocol, after a master is granted mastership of the bus 55, the bus is re-arbitrated and the current master is put on the bottom of the priority stack. Other arbitration may be used instead of the LRU algorithm if desired without departing from the principles of the present invention.

According to the preferred embodiment, the target IMAX bus 175 comprises a high speed, 32-bit, internal ASIC bus. The target IMAX bus functions as the primary means of communication between internal target devices and the internal expansion bus target interface 175. By standardizing on a particular internal bus protocol for the South bridge, much of the South bridge ASIC may be reused in future design efforts. Thus, the design of an internal target (such as the IDE IMAX target 155) is not tied to a specific expansion bus like PCI. Since a common bus target interface is used to couple other devices to the expansion bus, only the bus target interface 175 needs to be modified if the expansion bus protocol is changed or modified. The target IMAX bus 175 preferably is not tri-stated and is always driven.

Referring again to FIGS. 3 and 4, each of the target devices included in the preferred embodiment will now be briefly described. One skilled in the art will understand, however, that the present invention is not limited to the choice of targets included in the bridge logic device, and that various targets may be used as required to meet the needs and requirements of the computer system.

The IDE controller 155 operates as both a master and as a target within the South bridge 100. Thus IDE controller 155 couples to both the IMAX master bus 160 and the IMAX target bus 175. The IDE controller 155 preferably comprises a dual mode controller that couples to IDE interface for the IDE bus. In accordance with normal convention, any of a number of IDE devices may be coupled to the IDE controller 155 via the IDE bus. These devices include a hard drive, a floppy drive, and a CD drive, among others. In the preferred embodiment, a multi-bay structure may be used which permits various IDE devices to be exchanged in the multi-bay structure.

Similarly, the ISA controller 145 (FIG. 3) operates as both an IMAX master and slave. Thus, the ISA controller 145 couples to the IMAX master bus 160 and to the IMAX target bus 175. The ISA controller also couples to an ISA bus, or sub-ISA bus and controls transactions between components on the ISA (or sub-ISA) bus and other system components external to the ISA bus.

The interrupt controller 170 preferably controls interrupt requests from the South bridge 100 to the CPU. In the preferred embodiment, the interrupt controller includes two separate controllers, one of which is the master and one of which is the slave. The INT output of the slave controller is cascaded into the IRQ2 input of the master controller. The master controller may be programmed in the fully nested mode to permit the slave controller to send the correct interrupt vector back to the CPU identifying the source of the interrupt. In the preferred embodiment, both master and slave interrupt controllers comprise INTEL 8259 controllers. Further, according to the preferred embodiment, any outstanding PCI cycles to secondary I/O busses (such as ISA, PCMCIA, etc.) must be completed before write cycles are posted to the interrupt controller. The interrupt controller 170 couples to the ACPI/power management logic 165 and receives an internal system management interrupt (itSMI) signal for ACPI logic 165. In addition, the interrupt controller couples to the CPU 25 (FIG. 2) via an interrupt bus. As shown in FIGS. 3 and 4, one of the interrupt signals that may be transmitted by the interrupt controller 170 to the CPU is a system management interrupt (SMI) signal. In the preferred embodiment, the SMI signal is asserted on interrupt request line 10 (IRQ[10]). In response to the assertion of the SMI signal, the CPU enters a System Management Mode.

Referring still to FIGS. 3 and 4, the ACPI/power management logic 165 preferably operates as a slave or target within the South bridge 100, and couples externally to a 16 bit General Purpose I/O bus. In addition to the internal IMAX SMI (itSMI) signal transmitted to the interrupt controller 170, the ACPI/power management logic 165 also transmits an IMAX retry (itRetry) signal to the PCI target interface 185 indicating that the IMAX cycle cannot currently be completed.

In accordance with the preferred embodiment, the ACPI/power management logic 165 conforms to the Advanced Configuration and Power Interface Specification (ACPI). The ACPI/power management logic preferably supports five reduced power states, including Device Idle, System Idle, Global Standby, System Standby, and Hibernation. A more complete description of ACPI may be found in *ACPI Design Specification* (Microsoft/Intel/Toshiba). The Device Idle mode permits inactive devices to be placed in a reduced power state. Thus, the Device Idle mode permits a local standby condition of selected components. In the preferred embodiment, the system components listed in Table I may be placed in a low power mode. One skilled in the art will understand that other devices could be added to this list or substituted for devices in the following list. Similarly, some or all of the following devices may be removed from the list.

TABLE I

Reduced Power Mode Devices

| Device | Reduced Power Mode |
|---|---|
| Floppy drive | Power to the device is removed |
| Hard drive | The hard drive preferably has two modes of reduced power - spun down, and sleep. During spun down mode, the rotating media is suspended. During sleep, power is removed from a portion of the drive electronics. |
| PCMCIA | No inactivity timer. Reduced-power mode only is entered or exited via set-up. Reduced-power mode means 50 mA current limit and no 12 volt supply. |
| Screen save | The LCD power is removed and the video port is disable. If an external CRT is connected, the screen is blanked and put in a reduced-power mode. |
| Serial ports | The power to the serial ports is removed (each port has its own timer and control logic). |
| Parallel port | ECP sleep mode is entered. |
| Audio | Analog circuitry is powered-down. |
| Modem | The modem internally power manages itself. During long periods of inactivity, the modem will power down non-essential parts. |

For each of the power managed I/O devices enumerated above, a separate timer (not shown) defines the period of inactivity before the device becomes powered-down. Each timer preferably is loaded with a value programmed in a corresponding Device I/O Timer Load Register. For each of the I/O timers except the floppy drive timer and the hard drive timer, a programmable Device I/O Base Register and a Device I/O Trap Mask Register define the addresses of the device to be power managed. The floppy drive timer and the hard drive timer preferably have fixed address ranges corresponding to the floppy drive and the hard drive, respectively.

When a device is being monitored for inactivity, the associated timer preferably generates an SMI signal if the timer times out. Thus, if there are no I/O accesses to a device (such as the floppy drive, for example) for a predetermined period of time, the timer generates an SMI, causing the CPU to place the device in a low power mode. If an access occurs to the device before the associated timer times out, the associated timer is re-loaded with the programmed timer value.

In accordance with the preferred embodiment, the South bridge 100 preferably permits a "trap mode" to be enabled once a device is placed in a low power mode to prevent cycles from being executed to a device in a low power mode. As the following discussion will describe in detail, when an I/O trap mode is enable for any device, logic in the South bridge inserts wait states during "trapped" I/O cycles (cycles to a device that is in a low power mode) to ensure that an SMI signal is asserted early enough for the CPU to automatically retry the trapped I/O cycle once the device has been powered-up again.

Referring still to FIGS. 3 and 4, the ACPI/power management logic 165 preferably includes Device I/O Trap Registers that permit the device activity timers and device I/O trapping to be enabled. As one skilled in the art will appreciate, these registers may be located elsewhere within the South bridge (or even external to the South bridge), if desired. Referring now to FIG. 6A, a Floppy I/O Trap Mask Register is shown, while a Hard Drive I/O Trap Mask Register is similarly shown in FIG. 6B. As these registers illustrate, bit 6 defines whether the activity timer is activated for that particular I/O device. Thus, if bit 6 is set in the Floppy Trap Mask Register of FIG. 6A, the activity timer for the floppy drive is enabled. Bit 7, conversely defines whether the I/O trap mode is enable. Thus, if bit 7 is set in the Hard Drive Trap Mask Register of FIG. 6B, the I/O trap mode is enabled for accesses to the hard drive when it is powered-down (or it is in "sleep" mode). If the trap mode is enabled, an SMI is generated when a transaction targets the device in sleep mode. Although only two Trap Mask Registers are shown in FIGS. 6A and 6B, preferably a similar register is provided for each device included in Table I.

Referring now to FIG. 7A, the ACPI/power management logic 165 preferably includes a Device I/O Trap Status Register that indicates the trap status of each of the devices included in Table I. As one skilled in the art will appreciate, the Trap Status Register may be located in the interrupt controller or in some other location within the South bridge (or even external to the South bridge), if desired. As shown in FIG. 7A, bit 0 indicates the trap status of the floppy disc drive, while bit 1 indicates the trap status of the hard drive. If the status bit is set, an internal SMI (itSMI) signal is generated and transmitted to the interrupt controller 170. Conversely, if a status bit is reset, the itSMI signal is removed and the device can be accessed by an external master.

Figure 7B:
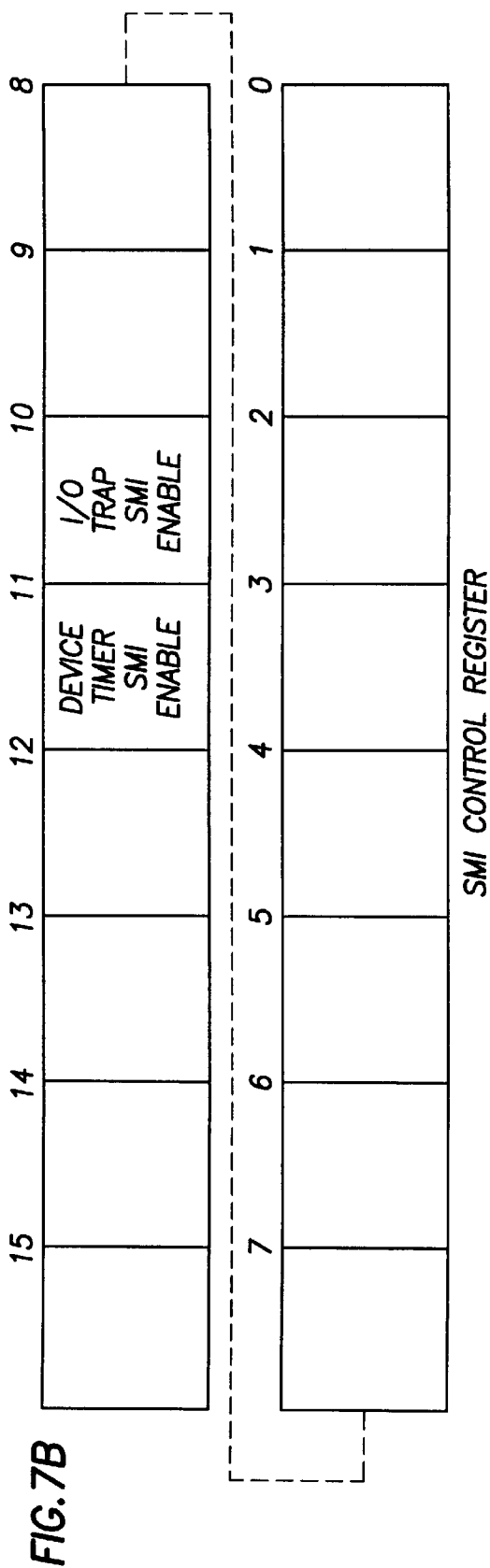

As shown in FIG. 7B, the South bridge preferably includes an SMI Control Register that can be programmed to indicate which power management conditions can generate an SMI signal. In the preferred embodiment, the SMI Control Register physically resides in the interrupt controller logic 170, although one skilled in the art will appreciate that this register may be located elsewhere in the South bridge 100 if desired. As shown in FIG. 7B, bit 10 of the SMI Control Register determines whether an SMI can be generated in response to an I/O trap condition. If bit 10 of the SMI Control Register is set, then an I/O trap condition, as indicated by the assertion of itSMI by ACPI/power management logic 165, causes an SMI signal to be generated on interrupt line 10. Similarly, bit 11 of the SMI Control Register determines whether an SMI can be generated in response to the expiration of an activity timer. If an activity timer expires, an SMI may be generated on interrupt line 11 to the CPU to cause the CPU to power-down the inactive device.

Figure 7C:
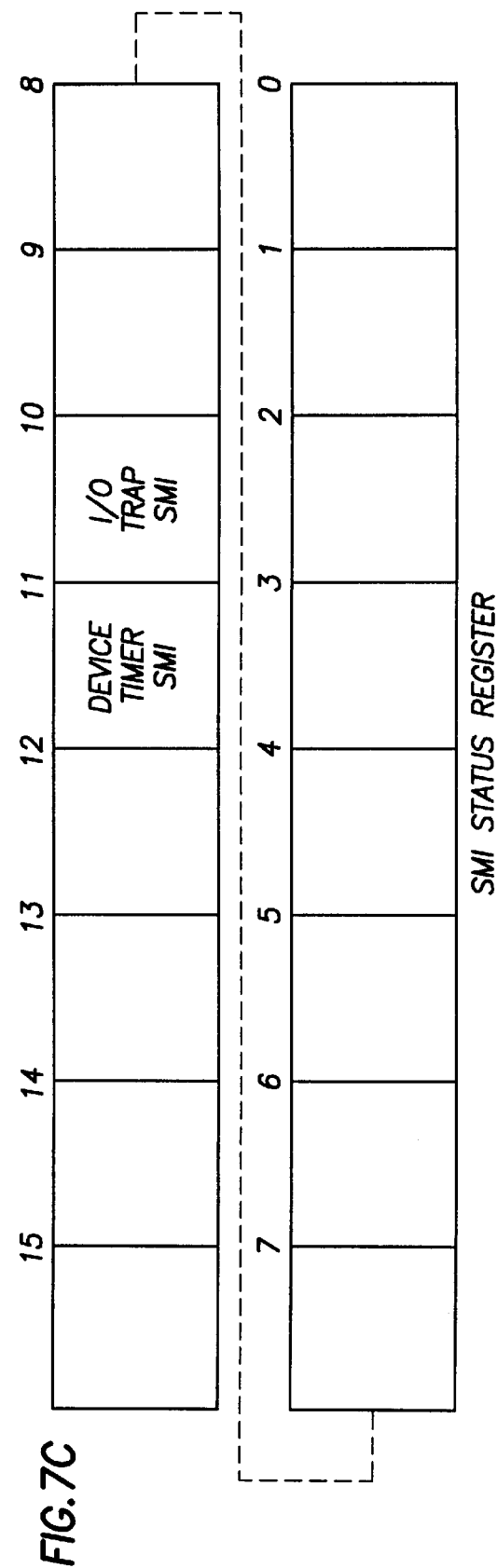

Referring now to FIG. 7C, the South bridge preferably also includes an SMI Status Register. The SMI Status Register indicates which event caused an SMI to be generated. Thus, bit 10 in the SMI Status Register is set indicating that a trap condition caused the generation of an SMI signal to the CPU. If a device times causes the generation of an SMI signal, bit 11 is set in the SMI Status Register.

Figure 5:
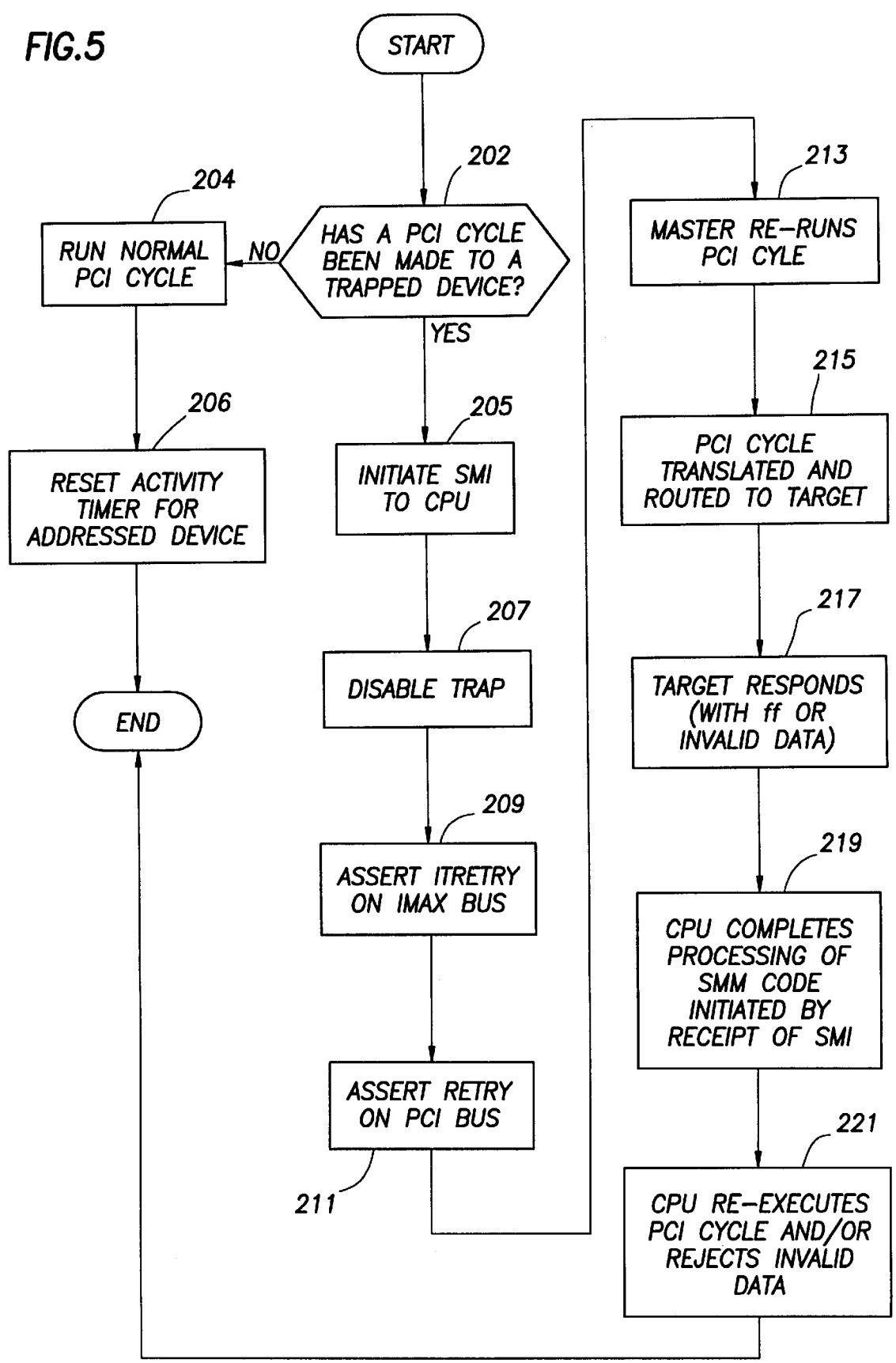
FIG. 5 is a flow chart illustrating the operational flow of the methodology of the present invention.

Referring now to FIGS. 3, 4 and 5, the operation of the present invention will now be described in accordance with the preferred embodiment. As shown in step 202 of FIG. 5, the South bridge logic 100 determines if a cycle on the expansion bus 55 has been made to a device that has been placed in a low power mode. This is preferably done by comparing the address of the transaction with the addresses of any trapped device. The trap status of the I/O devices is indicated in the Device I/O Trap Status Register of FIG. 7A. If the cycle is not targeted to a device in a low power mode, a normal PCI cycle is performed in step 204 and the activity timer for the targeted device is reset (if that device has an activity timer).

If the cycle is to a device in a low power mode, (the answer to decision step 202 is "yes"), then the transaction is intercepted and an internal SMI (itSMI) signal is generated by the ACPI logic 165. The interrupt controller 170 receives the itSMI and sets bit 10 in the SMI Status register, which in turn causes an SMI to be generated to the CPU on interrupt line 10, as indicated in step 205. In step 207, the trap enable of the targeted device is cleared, by clearing the enable bit in the associated Trap Mask Register of FIG. 6A or 6B. The ACPI logic 165 asserts the internal retry (itRetry) signal to the target interface 185 in step 209, and the target interface asserts a retry signal on the expansion bus 55 in step 211, which is received by the master device that initiated the cycle to the trapped device.

Subsequently, the master requests mastership of the expansion bus 55, and when it obtains mastership, the master retries the cycle, as indicated in step 213. The target interface 185 receives the cycle and translates the cycle to the IMAX protocol before routing the cycle to the internal target (step 215). At that point and as shown in step 217, the target responds with either ff as data or with other invalid data, assuming the device has not yet been removed from the low power mode. At some point, the CPU completes processing of system management code (which was called in response to the SMI signal), as indicated in step 219. Because the SMI was timely received (at least four clocks before the receipt of data), the CPU preferably re-executes the cycle once the device is removed from the low power mode (step 221). Alternatively, the CPU may simply reject the invalid data.

The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

We claim:

1. A bridge logic device coupling at least one external peripheral device to a CPU via a primary expansion bus, said bridge logic comprising;

at least one internal target device coupled to said external peripheral device and exercising control over said external peripheral device, and wherein said peripheral device is capable of being placed in a low power mode;

power management logic that includes a status register that indicates whether the peripheral device is in a low power mode, and which generates a system management interrupt signal when cycles on the primary expansion bus are addressed to the peripheral device;

an interrupt controller that receives the system management interrupt signal and which relays an interrupt signal to the CPU;

a target interface coupled to said internal target device via an internal bus, and wherein said target interface asserts a retry signal to a master device that initiates a cycle to the internal target only when the peripheral device is in sleep mode; and said internal bus has a bus protocol that is independent of the protocol of the primary expansion bus.

2. A bridge logic as in claim 1, wherein said target interface also couples to said power management logic via said internal bus.

3. A bridge logic as in claim 2, wherein said interrupt controller also couples to said target interface via said internal bus.

4. A bridge logic as in claim 3, wherein said internal target device couples to said external peripheral device via a secondary expansion bus.

5. A computer system as in claim 4, wherein said secondary expansion bus comprises an IDE bus, and said target device comprises an IDE controller integrated in the bridge logic device.

6. A bridge logic device as in claim 5, wherein the IDE controller couples to a multi-bay device capable of receiving a floppy drive and a hard drive, and the power management logic includes a timer associated with the floppy drive and the hard drive for causing one or both of the drives to be selectively powered down, and the status register indicates whether either drive is in a low power mode, and wherein the power management logic generates a system management interrupt signal when cycles on the primary expansion bus are addressed to either drive when in the sleep mode.

7. A bridge logic as in claim 2, wherein said primary expansion bus comprises a PCI bus, and wherein said target interface couples to said PCI bus and translates cycles on the PCI bus to cycles that can be processed by the internal target device.

8. A bridge logic as in claim 7, wherein said internal bus comprises a standardized internal modular target expansion bus, and wherein a plurality of target devices are included in the bridge logic, all of which couple to said internal modular expansion bus.

9. A bridge logic as in claim 8, wherein said bridge logic device comprises a South bridge coupling the PCI bus to one or more secondary expansion busses.

10. A bridge logic as in claim 9, further comprising an expansion bus master interface coupled to said expansion bus; and an internal modular master expansion bus coupling said plurality of target devices to said expansion bus master interface.

11. A bridge logic as in claim 1, wherein said status register includes a bit dedicated to indicating the status of said peripheral device, and wherein the dedicated bit is set if the peripheral device is placed in a low power mode, and wherein the dedicated bit is reset once a system management interrupt signal is generated to permit retried cycles from the master device to be completed to the peripheral device.

12. A bridge logic as in claim 11, wherein the peripheral device comprises one of the following: a floppy drive, a hard drive, a sound card, a modem, or a PCMCIA card.

13. A bridge logic device coupling an external peripheral device to a CPU via a primary expansion bus, said bridge logic comprising;

an internal target device coupled to said external peripheral device and exercising control over said external peripheral device, and wherein said peripheral device is capable of being placed in a low power mode;

power management logic that includes a status register indicating whether the internal target device is in a low power mode, and which generates an internal system management interrupt signal when cycles on the primary expansion bus are addressed to the internal target device;

an interrupt controller that receives the internal system management interrupt signal and which relays an system management interrupt signal to the CPU; and a target interface coupled to said internal target device, and wherein said target interface asserts a retry signal on the primary expansion bus only when a cycle targets the peripheral device while it is in sleep mode.

14. A bridge logic as in claim 13, wherein said status register includes a bit dedicated to indicating the status of said peripheral device, and wherein the dedicated bit is set if the peripheral device is placed in a low power mode, and wherein the dedicated bit is reset once an internal system management interrupt signal is generated, thereby permitting subsequent retried cycles to be completed to the peripheral device.

15. A computer system as in claim 13, wherein said expansion bus comprises a PCI bus, and said expansion bus target interface comprises a PCI bus target interface translating PCI cycles on behalf of said target device.

16. A bridge logic device as in claim 14, wherein the target device comprises an IDE controller that couples to a multi-bay device capable of receiving a floppy drive and a hard drive, and the power management logic includes a timer associated with the floppy drive and the hard drive for causing one or both of the drives to be selectively powered down, and the status register indicates whether either drive is in a low power mode, and wherein the power management logic generates the internal system management interrupt signal when cycles on the primary expansion bus are addressed to either drive when in the sleep mode.

17. A bridge logic as in claim 14, wherein said internal modular bus comprises a standardized internal modular target expansion bus, and wherein a plurality of target devices are included in the bridge logic, all of which couple to said internal modular expansion bus and to an associated peripheral device.

18. A bridge logic as in claim 15, wherein said bridge logic device comprises a South bridge coupling the PCI bus to one or more secondary expansion busses.

19. A bridge logic as in claim 13, wherein the peripheral device comprises one of the following: a floppy drive, a hard drive, a sound card, a modem, or a PCMCIA card.

20. A computer system, comprising:
a CPU;
a main memory;
a North bridge logic device coupling a primary expansion bus to said CPU and said main memory;
a South bridge logic device connected to said expansion bus, said South bridge logic coupling at least one secondary expansion bus to said primary expansion bus for running master cycles originating from devices on the primary expansion bus to said secondary expansion bus;
an external peripheral device coupled to said at least one secondary expansion bus;
and wherein said South bridge logic includes:
an internal target device coupled to said external peripheral device and exercising control over said external peripheral device, and wherein said peripheral device is capable of being placed in a low power mode;
power management logic that includes a status register indicating whether the internal target device is in a low power mode, and which generates an internal system management interrupt signal when cycles on the primary expansion bus are addressed to the external peripheral device;

an interrupt controller that receives the internal system management interrupt signal and which relays an system management interrupt signal to the CPU via an interrupt bus;

a target interface coupled to said internal target device, and wherein said target interface asserts a retry signal on the primary expansion bus only when an address is targeted to the peripheral device while it is in sleep mode; and said internal bus has a bus protocol that is independent of the protocol of the primary expansion bus.

21. A computer system as in claim 20, wherein said primary expansion bus comprises a PCI bus, and said expansion bus target interface comprises a PCI target interface that translates PCI master cycles to cycles that can be processed by the internal target device within the South bridge.

22. A computer system as in claim 20, wherein said at least one secondary expansion bus comprises one or more of the following busses: an ISA bus; a USB bus; or an IDE bus.

23. A computer system as in claim 20, wherein said peripheral device comprises a floppy drive.

24. A computer system as in claim 20, wherein said peripheral device comprises a hard drive.

25. A computer system as in claim 20, wherein said peripheral device comprises an audio card.

26. A computer system as in claim 20, wherein said peripheral device comprises a modem.

27. A computer system as in claim 20, wherein said peripheral device comprises a PCMCIA card.

28. A bridge logic as in claim 20, wherein said status register includes a bit dedicated to indicating the status of said peripheral device, and wherein the dedicated bit is set if the peripheral device is placed in a low power mode, and wherein the dedicated bit is reset once an internal system management interrupt signal is generated, thereby permitting subsequent retried cycles to be completed to the peripheral device.

29. A method for handling cycles from a primary device to a device that can be placed into a sleep mode, comprising:
comparing the address of a cycle to the address of devices that are in sleep mode;
initiating an interrupt signal to request a device in sleep mode be made available if a cycle targets the device in sleep mode;
asserting a retry signal to request the primary device to retry the cycle at a later time if the device is in sleep mode and not for every attempted cycle from the primary device; and
routing the cycle to the targeted device when the cycle is retried.

30. A method as in claim 29, further including the step of determining if a device is in sleep mode by examining a bit in a trap status register.

31. A method as in claim 29, wherein the interrupt signal comprises a system management interrupt signal transmitted to a CPU.

32. A method as in claim 31, wherein the CPU determines that the targeted device is in sleep mode based upon the timely receipt of the system management interrupt signal, and the CPU causes the cycle to be re-executed to the target device when the target device is restored to full power.

* * * * *